US007914430B2

(12) United States Patent
Pajala et al.

(10) Patent No.: US 7,914,430 B2
(45) Date of Patent: Mar. 29, 2011

(54) ROLL (75) Inventors: Matti Pajala, Jyväskylä (FI); Aaron Mannio, Järvenpää (FI)

(73) Assignee: Metso Paper, Inc., Helsinki (FI)

( * ) Notice: Subject to any disclaimer, the term of this patent is extended or adjusted under 35 U.S.C. 154(b) by 1033 days.

(21) Appl. No.: 11/576,436

(22) PCT Filed: Oct. 4, 2005

(86) PCT No.: PCT/FI2005/050344
§ 371 (c)(1),
(2), (4) Date: Mar. 30, 2007

(87) PCT Pub. No.: WO2006/037859
PCT Pub. Date: Apr. 13, 2006

(65) Prior Publication Data
US 2008/0058188 A1    Mar. 6, 2008

(30) Foreign Application Priority Data
Oct. 4, 2004  (FI) .................................... 20041287

(51) Int. Cl.
*B31F 1/07*    (2006.01)
(52) U.S. Cl. ............... 492/20; 492/42; 492/49; 492/53
(58) Field of Classification Search .............. 492/20, 492/42, 49, 53
See application file for complete search history.

(56) References Cited

U.S. PATENT DOCUMENTS

| 3,138,338 | A | * | 6/1964 | McKenna ................. 241/294 |
| 4,664,644 | A | * | 5/1987 | Kumata et al. ............ 464/180 |
| 4,692,971 | A |   | 9/1987 | Ginter |
| 4,856,158 | A | * | 8/1989 | Lindroos et al. ........... 492/20 |
| 4,856,159 | A |   | 8/1989 | Skyttä |
| 5,438,920 | A |   | 8/1995 | Koivukunnas et al. |
| 6,294,490 | B1 | * | 9/2001 | Zou et al. ................... 501/9 |
| 6,379,290 | B1 | * | 4/2002 | Sohl ........................ 492/56 |
| 2004/0038788 | A1 | * | 2/2004 | Savolainen et al. ........ 492/59 |

FOREIGN PATENT DOCUMENTS

| DE | 29613795 | 12/1996 |
| EP | 0363887 A2 | 4/1990 |
| FI | 72766 | 3/1987 |

(Continued)

OTHER PUBLICATIONS http://www.matweb.com "MATWEB_2" Material Property search for Modulus of Elasticity 160-250 GPa under "Other Engineering Materials" including "Composite Fibers".*

(Continued)

*Primary Examiner* — David P Bryant
*Assistant Examiner* — Jacob J Cigna
(74) *Attorney, Agent, or Firm* — Stiennon & Stiennon (57) ABSTRACT A roll is supported at the middle thereof, for a paper, board or finishing machine is composed of two sections, a so-called inner shell (54') and an outer shell (52'), supported by one another in the middle area of the roll (50'). The nominal stiffness of the manufacturing material of the inner shell (54') of the roll is substantially greater than the nominal stiffness of the manufacturing material of the outer shell (52') of the roll.

17 Claims, 3 Drawing Sheets

FOREIGN PATENT DOCUMENTS

| | | | |
|---|---|---|---|
| FI | 115554 | B | 5/2005 |
| GB | 1208539 | | 10/1970 |
| GB | 1208539 | A * | 10/1970 |
| WO | 97/42375 | A1 | 11/1997 |
| WO | 99/09329 | A1 | 2/1999 |
| WO | 2006/037859 | A1 | 10/2005 |

OTHER PUBLICATIONS http://www.matweb.com "MATWEB" Material Property search for Modulus of Elasticity of Steel under "Metals" including "Ferrous Metals".*

Search Report issued in PCT/FI2005/050344.

* cited by examiner

ROLL

CROSS REFERENCES TO RELATED APPLICATIONS

This application is a U.S. national stage application of International App. No. PCT/FI2005/050344, filed Oct. 4, 2005, the disclosure of which is incorporated by reference herein, and claims priority on Finnish App. No. 20041287, filed Oct. 4, 2004.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to a roll for a paper, board or a finishing machine. More particularly, the invention relates to a composite roll supported at the middle thereof. Most preferably, the composite roll of the invention is used as a spreader roll or a calender fly roll in a paper or board machine. The invention also relates to a new type of supporting the roll and a drive of the roll in a hypercritical speed range.

Rolls as mentioned above, which are supported at the middle thereof are primarily used as lead rolls, spreader rolls and fly rolls in the paper industry. They feature deflection properties which are different from those of conventional rolls supported at the ends thereof. Hence, for example length differences between the edge and the middle section of the fabric can be compensated with them, and it can be assured that the fabric or the web will not be wrinkled, by bending the roll into a bow form, away from the direction of approach, spreader roll.

A type of spreader roll is disclosed in FI patent publication 72766 in which the roll is formed by two concentric cylindrical shells being spaced from each other when in a state of rest; sometimes they are also called inner and outer shells, which are interconnected at the middle of the roll in the length direction thereof. The inner shell is provided with shaft journals which are rotatably mounted on bearings. When a roll of the above-described type is rotated in a paper machine or equivalent, either the machine fabric or the web, or both of them together, make a deflection of some degree to the inner shell of the roll. The deflection is, however, not transferred to the outer shell, which is attached to the inner shell only around the middle of the roll, as explained above, but it tends to maintain its straight cylindrical shape. Depending merely on the stiffness of the outer shell, it can either stay straight in operation or bend in the opposite direction in view of the inner shell. In both cases, the risk of the fabric or the web becoming wrinkled has been avoided.

It is also noteworthy, with regard to said FI patent publication 72766, that it relates to a composite spreader roll, which is made of, e.g. carbon fiber reinforced epoxy resin.

Calender fly rolls are discussed, e.g., in U.S. Pat. Nos. 4,692,971 and 5,438,920; and patent applications WO-A1-9909329 and WO-A1-9742375. Their structure greatly resembles that of the above-described spreader roll, at least in so far as their structure relates to the present invention.

Further, an arrangement suitable for operating as both a spreader roll and a fly roll is discussed in the Metso Paper, Inc.'s FI patent application 20031384, which describes a roll, the inner shell whereof is conventionally mounted on bearings at the frame structure of the machine. The actual invention of the application is the supporting of the outer shell at the ends thereof through an adjustable bearing arrangement on the frame structure of the machine in such a manner that both the direction and the amount of the deflection of the outer shell are controllable.

The rolls supported at the middle thereof as described hereinabove feature relatively flexible outer shells and relatively stiff inner shells. This property has been brought about through inter-dimensioning of the inner and outer shells and/or through selections of the materials.

A problem often faced, however, when using these rolls, especially calender fly rolls, but also at some points where spreader rolls are used, is the critical nominal frequency of the roll. When the outer shell of a composite roll is supported by the inner shell, only, and in most cases at the middle of the roll, only, a first critical nominal frequency of the roll remains relatively low, provided that the roll diameter is maintained equal to that of the existing fly rolls or spreader rolls. In practice, this means that in order to enable use of the roll at a certain rotating speed, it should be ascertained that the rotating speed is not within the critical nominal frequency of the roll. In most cases, the rotating speed of the roll is maintained lower than the critical nominal frequency. In practice, at certain points of use where it seems that the rotating speed of the roll will coincide its critical nominal frequency, the only way to avoid it is to increase the roll diameter. However, this is not normally possible because there is no room for rolls with dimensions of that order, for example, in supercalenders.

In other words, a dimensional limitation is the most prominent problem because, for example, the calender elevator and the roll clearance have to meet certain safety regulations. A larger diameter of the roll naturally also changes the nip outlet and inlet angles.

Another problem, which is noteworthy, is that tension measuring cannot be effected at least with certain prior art spreader rolls because with these rolls, bowing of the roll directs a moment to the attachment of the roll ends, which moment significantly hampers tension measuring. Rolls of this type are formed of one cylinder, which is in most cases manufactured of composite material and which is supported at both ends thereof, at two points axially spaced from each other, on the frame structure of the paper or board machine. One of the points can be regarded as a stationary point of support, whereas through the other point the roll is subjected to a radial force, which is either pushing or pulling and causes the roll to bow. Said force is thereby also directed to the devices by which the roll is fastened to/supported by said frame structure. Besides the tension also the force/moment bowing the roll is naturally sensed by the sensor used for tension measuring, and the data from the sensor is no more valid. In other words, when this kind of a roll is used, tension has to be measured at a separate roll.

Thus, an object of the present invention is to eliminate at least part of the problems of the prior art described above.

SUMMARY OF THE INVENTION

A more extensive examination of the factors that can be used to influence on the nominal frequency of the roll reveals that the elasticity properties of the roll have a relatively strong effect on the nominal frequency. Thus, we can start to examine whether it would be possible to manufacture a roll of such a material or materials that, by utilizing their elasticity properties, the critical nominal frequency could be raised to a sufficiently high level, yet having no need to restrict the dimensional requirements for the roll. The present invention has resulted in a roll the inner and outer shells of which have different elasticity properties.

In a sense, a similar type of a roll is discussed in EP-A2-0 363 887, which, however, does not teach a roll supported at the middle thereof, but a conventional roll which is composed of several different layers. At least part of the layers has been manufactured of composite materials wound at least in two different directions. For example, in one case the innermost layer of the roll has been wound to an angle of from 75 to 90 degrees with regard to the axial direction, in other words almost or exactly radially. The outermost layer of the roll again has been wound to an angle of from 0 to 35 degrees with regard to the axial direction. It is taught that the internal stresses of the roll manufactured in this manner are compressive stresses in the radial direction, whereby inter-layer cracking cannot occur in the roll. Also other advantageous properties are mentioned, such as elasticity properties suitable for the purposes presented in said EP application, and control of axial stretching.

Further, the elasticity and vibration properties of the roll are positively influenced by the fact that besides being supported by one another at the middle of the roll, the inner and outer shells of the roll are also supported by the bearing and fastening devices of the roll at the ends of the roll, whereby the vibration of the ends of the outer shell is better controllable.

In a preferred embodiment in accordance with the invention, fastening and supporting devices for the roll are also used, by which the outer shell of the roll can be deflected, at the ends thereof, in relation to the inner shell, for bowing the roll. In this case, the power transmitted by the bowing of the roll to the attachment thereof is practically non-existent, when compared with prior art, which enables tension measuring at the roll.

It is characteristic of the roll for a paper, board or finishing machine, in accordance with the present invention, which roll is supported at the middle thereof and composed by two sections, i.e. so-called inner and outer shells, which are supported by one another in the middle area of the roll, that the nominal stiffness of the manufacturing material of the inner shell of the roll is substantially greater than the nominal stiffness of the manufacturing material of the outer shell of the roll.

For example, the following advantages produced by the invention are worth mentioning:

With rolls supported at the middle thereof, in accordance with the invention, the critical nominal frequency is safely high, even with fly rolls of a conventional dimension.

Rolls in accordance with the invention, being of composite structure, can be used as spreader rolls or for example supercalender fly rolls, because they can be built sufficiently small in diameter, with no need to compromise with other roll properties.

The roll in accordance with the invention can also be run at a hypercritical area, which means that the rotating speed of the roll is higher than its nominal frequency. Thus, the roll diameter is small and the roll will be less expensive, both in respect to the material cost and the manufacture; further the roll is capable, in view of its size, of replacing steel rolls used in earlier arrangements.

Supporting the ends of the outer shell of the roll in a manner described in the invention also makes the use of the roll easier at hypercritical speeds.

In accordance with a preferred embodiment of the invention, the roll is also applicable to points of use in which tension measuring is necessary in conjunction with the roll.

Both the deflection of the outer shell of the roll and the adjustment of the roll bow can be effected by one adjusting device. Furthermore, the bowing is always carried out at the same level irrespective of the amount of bow.

The roll of the invention is described more in detail in the following, with reference being made to the accompanying drawings.

DESCRIPTION OF THE PREFERRED EMBODIMENTS

Figure 1:
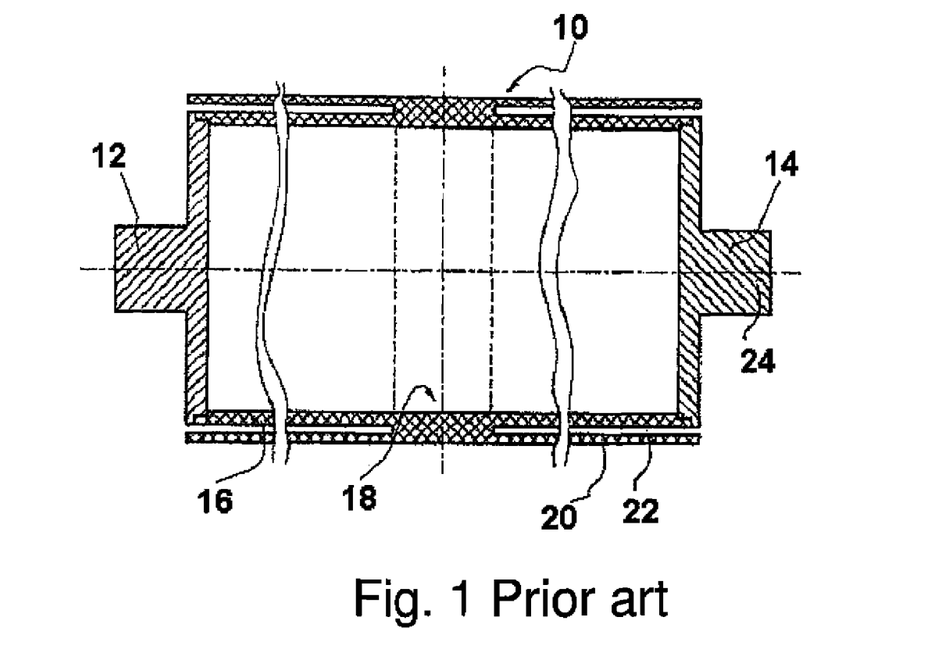
FIG. 1 illustrates a prior art composite roll supported at the middle thereof as disclosed in FI patent 72766.

FIG. 1 illustrates a prior art composite roll 10 supported at the middle thereof as disclosed in FI patent 72766. It is composed of a composite inner shell 16 attached to shaft journals 12 and 14 and an outer shell 20 which is also of a composite structure and which is attached to the longitudinal middle area 18 of the inner shell. Conventionally, it is typical to the structure of the rolls supported at the middle thereof that the end area of the rolls, or more specifically, the area in which the outer shell of the roll is not supported by the inner shell thereof, is provided with an annular spacing 22 between the outer and the inner shells, enabling, e.g. the outer shell to stay straight in spite of the inner shell 16 being bowed, or the outer shell 20 to bow in the opposite direction in relation to the inner shell 16. In composite rolls supported at the middle thereof, the inner and outer shells are conventionally either made of the same material, in which case the inner shell is essentially thicker than the outer shell, which ensures the stiffness of the inner shell, or the inner shell is made of steel and the outer shell of composite material.

The roll shown in FIG. 1, supported at the middle thereof, functions in practice so that when the force of the web and/or fabric influences the roll through the outer shell 20, e.g. in the figure downwards, and when the roll is supported by means of its shaft journals 12 and 14 through bearings on the machine frame, the inner shell 16 of the roll tends to bow downwards between the shaft journals 12 and 14. However, this tendency to bow is not transferred to the outer shell 20 because it is supported by the inner shell only at the middle section thereof, in other words the section in which the direction of the inner shell is essentially the same as the direction of the shaft line 24 running through the center line of the bearings.

In this case, besides transmitting the web force to the inner shell, the outer shell bows in the opposite direction, in other words upwards in the figure by the action of the web force because the edge sections of the outer shell are less stiff than the middle section which is supported by the inner shell. In this case, the outer and inner shells of the roll bow in the opposite directions. Such structures are also known in which the straightness of the outer shell of the roll is aimed at, irrespective of the bowing of the inner shell.

A problem with the described roll arrangement supported at the middle thereof is among other things that the critical nominal frequency of this kind of a roll supported at the middle thereof is very low.

Figure 2:
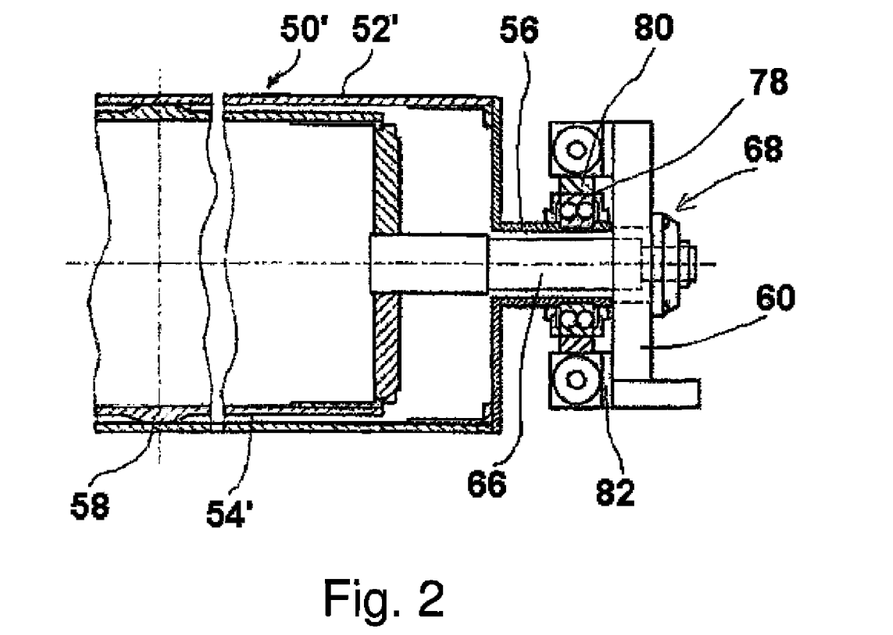
FIG. 2 illustrates a preferred embodiment of the present invention together with an optional construction of a fly roll described more in detail in FI patent application 20031384.

FIG. 2 illustrates a roll in accordance with a preferred embodiment of the invention together with a supporting arrangement described in greater detail in Finnish patent app. No. 20031384, which supporting arrangement is especially suitable to be used in connection with the roll in accordance with the invention. In said supporting arrangement, the inner shell of the roll is supported in a normal way by the frame structure of the roll, but the outer shell has not been left free in a conventional manner, but it is supported through its ends preferably on the same frame structure so that the amount and direction of the bow thereof is controllable. So, the roll 50' shown in FIG. 2 is composed of an outer shell 52' and an inner shell 54', a shaft sleeve 56 and a shaft journal 66. The inner shell 54' of the roll 50' is rotatably supported through a bearing 68 by a stationary support structure 60, in which case the outer end of the shaft journal 66 of the inner shell 54' cannot move in a radial direction. The shaft sleeve 56 of the outer shell 52' is supported through a bearing 78 by a moving bearing housing 80. In this embodiment, the bearing housing 80 is supported through guides 82 by the support structure 60 so that the shaft sleeve 56 and therewith the end section of the outer shell 52' of the roll 50' can move in the direction defined by guides 82. The position of said guides can also be rotated in a radial plane, in which case the direction of the bow of the outer shell can be controlled. In the same way, the guides can be provided with stops, for example in a manner described in the above-identified patent application, by means of which stops the amount of deflection of the outer shell is controllable.

In the arrangement shown in FIG. 2, the inner and outer shells of the rolls have not been attached to each other, but the inner shell 54', essentially the center line CL thereof is provided with a bulb 58 the outer diameter whereof essentially equals the inner diameter of the outer shell 52'. Preferably, said outer diameter of the bulb 58 is slightly bigger than the inner diameter of outer shell 52', but only to the extent that the inner shell 54' can be pushed into the outer shell 52' causing no bulbs to emerge on the outer surface of the outer shell 52'. Other manners of attaching the inner and outer shells to each other are, among other things, sizing or shrinking, or they can be made to an integral structure already in the manufacturing stage of the parts when they are still composite material, as will be disclosed later in connection with FIG. 3.

In view of the present invention, the basic difference between this roll and the structure illustrated in FIG. 1 is that, in the arrangement of the invention, the inner shell 54' and the outer shell 52' of the roll are made of distinctly different materials in order to be able to optimize both the nominal frequency and the deflection and elasticity properties of the roll.

The basis for an optimal operation of the fly roll or equivalent is that the inner shell is essentially stiffer than the outer shell. The axial modulus of elasticity of the inner shell laminate should be at least 80 GPa, preferably even 250 GPa. These values are, however, higher than what can normally be reached with carbon fiber reinforced rolls. The elastic modulus values of from 80 to 250 GPa are achieved by preparing the inner shell of very stiff carbon fibers by means of winding. The modulus of elasticity of certain stiff carbon fibers which are suitable for the purpose and which are called tar or pitch fibers in common language, is about 400 GPa in the fiber direction of a rectilinear layer.

More specifically, in principle two types of carbon fibers exist, i.e. so-called PAN-based fibers and pitch-based fibers. In PAN-based fibers, the basic material is polyacrylic nitrile and in pitch-based fibers pitch which is produced in oil refining and is primarily categorized as waste. Pitch-based fibers are commonly called tar or pitch fibers. Due to differences in both the basic material and the manufacturing technique, the modulus of elasticity of these pitch-based fibers is at its best almost double in comparison with PAN-based fibers. When these pitch fibers are wound almost axially in preparing the roll, it is possible to achieve an axial modulus of elasticity of from 160 to 250 GPa. When the roll is made of the material described above, in a manner to be explained later on, deflection of the inner shell will be minimized and it is possible to dynamically achieve outer diameters of supercalender fly rolls of today, which is a common prerequisite for the use of the rolls described above for replacing previously used steel-made fly rolls, which have bearing and other problems of their own.

In other words, a roll in accordance with the invention can be manufactured, for example, so that the outer shell is made of ordinary fibers in a conventional way, i.e. by winding, for example in a manner shown in U.S. Pat. No. 4,856,158, using mainly axial winding angles, the winding angle being from 0 to 30 degrees in view of the axial direction, in which case the axial modulus of elasticity of the outer shell laminate will be approximately from 30 to 80 GPa. In some cases, the outer shell can also be made of some other suitable material, for example, non-reinforced plastic material. The inner shell is correspondingly wound using mainly axial angles of from 0 to 30 degrees, only of stiffer fibers, in which case the axial modulus of elasticity of the inner shell laminate is about from 2 to 4-fold with respect to the axial modulus of elasticity of the outer shell laminate. Both shells do have also layers which have been wound more in the circumferential direction, from +/−45 to +/−85, to hold the shell in shape. Thus, the term "mainly axial" means that preferably over 70% of the layers have been wound using said axial angles.

Another way of comparing both various rolls or parts thereof and their properties with each other is to use the nominal stiffness in the axial direction of the laminate as a comparison parameter, which is calculated by means of a formula $k_{ax}=E_{ax}/\rho$ where $E_{ax}$ is the modulus of elasticity of the laminate of the wound tube or shell in the axial direction and $\rho$ is the density of said tube or shell, which is of the order of 1550 kg/m$^3$ with carbon fibers. By using the nominal stiffness as a comparison parameter, the nominal stiffness of the outer shell $k_{ax}$ will be from 0.035 to 0.055 GNm/kg and that of the inner shell correspondingly $k_{ax}$ will be from 0.055 to 0.165 GNm/kg. It has to be noted, however, that with greater web widths, of over 6.5 m, the nominal stiffness of the inner shell $k_{ax}$ should be from 0.10 to 0.15 GNm/kg. If the corresponding nominal stiffness is, for comparison purposes, calculated for steel, the $k_{ax}$ value of steel will be 0.026 GNm/kg, showing that the nominal stiffness of a composite inner shell is from 4 to 6-fold in comparison with a steel-made inner shell.

Figure 3:
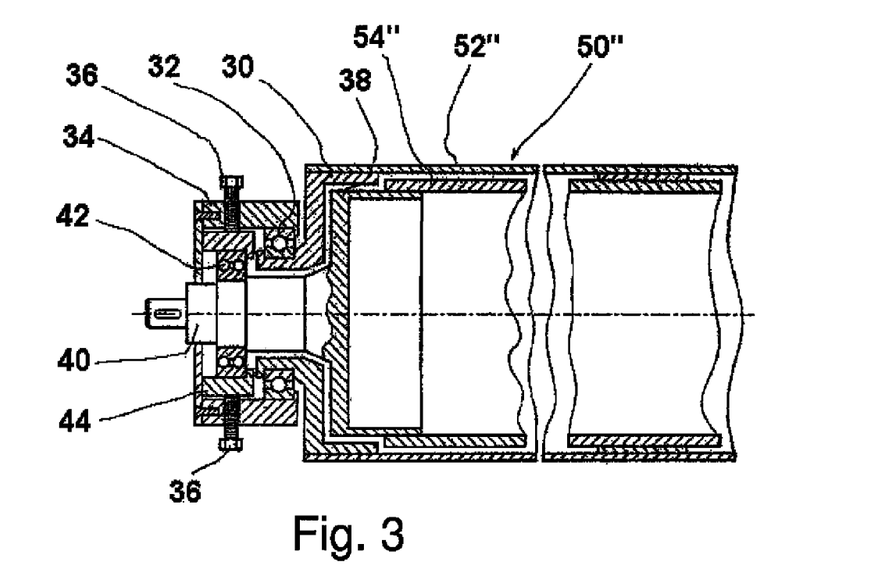
FIG. 3 illustrates another preferred embodiment of the present invention together with an optional construction of a fly roll described as prior art in FI patent application 20031384.

FIG. 3 illustrates another preferred embodiment of the invention showing how the inner shell 54" and the outer shell 52" of the roll can be supported by each other or be interconnected. The roll 50" can be manufactured, e.g., so that the inner shell is first wound onto a suitable core, after which the manufacturing mode described in U.S. Pat. No. 4,856,158 will be followed. In other words, two core pieces are placed onto the finished inner shell in such a manner that they leave between themselves a free area at the middle section of the roll, onto which free area the "ridge" binding the roll sections to each other can be wound in the case the roll is made of composite materials only. As core pieces can be used, if necessary, for example disposable sleeves made of material which breaks when hardened. The thickness of the shell of the core pieces naturally corresponds to the radial dimension of the annular spacing between the inner and outer shells of the roll. Further manufacturing of the roll is implemented so that the above-mentioned ridge purposed for binding the roll sections together is wound onto the area between the core pieces, and thereafter, winding is extended to the entire length of the roll. The above-mentioned ridge may be of the same material as either the inner or the outer shell, or it may be of some other material suitable for the purpose.

FIG. 3 illustrates also another alternative arrangement for supporting the ends of the roll, purposed for situations in which the roll ends are more preferably supported. In this alternative, the inner shell 54" of the roll is supported through a bearing 42 and bearing housing 44, so that its position is adjustable, on the frame structure of a paper, board or finishing machine or equivalent. Both ends of the inner shell 54" of the roll 50" are provided with end sleeves 38, to which is attached a shaft journal 40 protruding through the inner space of the shaft sleeve 30 of the outer shell 52". The shaft journal 40 again is rotatably supported at the outer end thereof through a bearing 42 by a bearing housing 44. The bearing housing 44 is supported by adjusting devices 36 depicted as adjusting screws. In other words, the end of the inner shell 54" can be radially transferred with respect to the end of the outer shell 52" by means of the adjusting devices 36, which produces a desirable bow of the outer shell 52". The outer shell 52" again is supported through a shaft sleeve 30 and a bearing 32 on the frame structure of the production machine.

Figure 4:
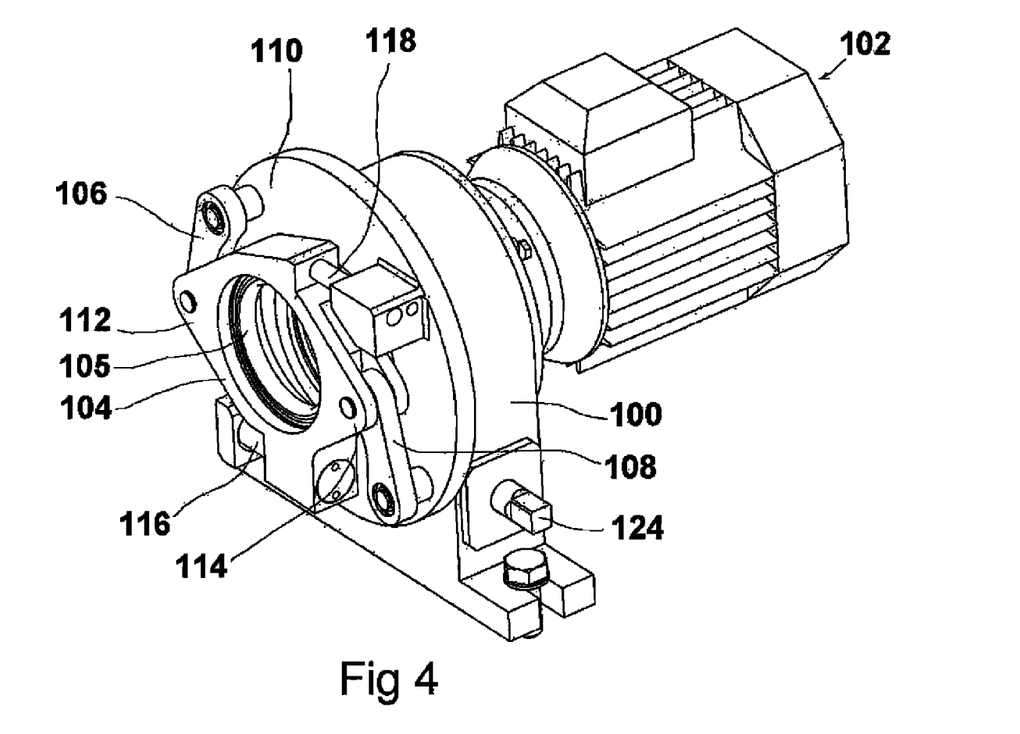
FIG. 4 illustrates another support arrangement for a roll supported at the middle thereof, in accordance with the invention, which arrangement is especially suitable to be used with spreader rolls.

FIG. 4 is a perspective view of a most preferred arrangement for the roll of the invention, supported at the middle thereof, as a perspective view. The support arrangement shown in the figure is most preferred for use in connection with spreader rolls, but naturally also other applications in connection with rolls to be bowed are possible. The support and drive arrangement of a roll in accordance with the figure, consists of a bearing bracket 100 to be attached to the frame structure of a paper, board, or some other production machine, to which bearing bracket e.g. the drive motor 102 of the roll is attached or based on, provided, naturally that it is a question of the drive side. The roll shaft serving as an extension of the inner shell of the roll, the roll may be, e.g. of the structure shown in FIGS. 2 or 3, extends from the left, through a hole at the center of the bearing bracket 100 as far as the clutch of the drive motor 102. The clutch per se may be of any known type. The shaft of the roll is supported by the bearing bracket 100 by means of a bearing which allows changes in the direction of the shaft of the roll, to a sufficient extent. Likewise, in some manner known per se, either the clutch of the drive motor 102 or the attachment of the drive motor 102 to the bearing bracket has been made such that it allows angle changes.

Further, it is worth mentioning in this connection that, naturally, a way of driving the roll may be a belt pulley arrangement at the end of the roll on the shaft journal of the inner shell, in which case the drive motor can be mounted relatively freely by the side of the roll or above or below the roll.

The shaft sleeve serving as an extension of the outer shell of the roll is situated inside a ring 104 the position of which is adjustable so that by changing the position of the ring 104 inside which the bearing sleeve is mounted on a bearing 105, it is possible to adjust the bow of the roll. The support arrangement shown in the figure enables bowing of the roll practically in any desired direction. More specifically, the ring 104 is supported by means of two levers, 106 and 108, arranged substantially symmetrically on two sides of the ring 104. One end of the levers 106 and 108 is pivoted to a rotatable disc 110 arranged separately in the bearing bracket. The other end of the levers 106 and 108 is pivoted to the circumference of the ring 104 through lugs 112 and 114. Due to the symmetrical way of fixing the levers 106 and 108, the course of the center point of the ring 104 is straight when the ring 104 is moved transversely. The ring, in the embodiment shown in FIG. 4, is supported from below by the disc 110 through a spring device 116, e.g. a gas spring, which is at its one end supported by said disc and at its other end by the ring 104. When viewed from the spring means 116, on the opposite side of the ring 104 is arranged an adjusting screw 118 or an equivalent device between the ring 104 and disc 110, in this embodiment, otherwise the placement is free, for moving the ring 104 transversely, or which in practice enables adjustment of the roll bow. The actual adjustment procedure is described in a greater detail in connection with FIGS. 5a and 5b.

The rotatable disc 110 described hereinabove means a preferred embodiment of the invention, which enables adjustment of the direction of the bow plane of the roll. Said disc 110 is arranged rotatably by the side of the bearing bracket 100 for example so that it is mounted on bearings through a cylindrical protrusion of the disc to the central hole of the bearing bracket, and the shaft of the roll to the inside of said protrusion. It is naturally possible to rotate the disc 110 around its shaft, for example by arranging a gear ring at some suitable point of the disc and correspondingly a thread bar in connection with the bearing bracket, an end of which thread bar is shown in the figure as a square foot 124 in which case rotating of the thread bar causes the disc 110 also to rotate around its shaft. Along with the disc 110 also rotates the ring 104 defining the bowing plane of the roll. Also other kinds of rotating devices known per se can naturally be used.

To be clear, it is still worth mentioning that the disc 110 is located on the roll side, when viewed from the bearing bracket 100. Furthermore, pivoted to or supported by the roll side surface of the disc are the above-mentioned levers 106 and 108, spring device 116 and adjusting device 118.

Figure 5A:
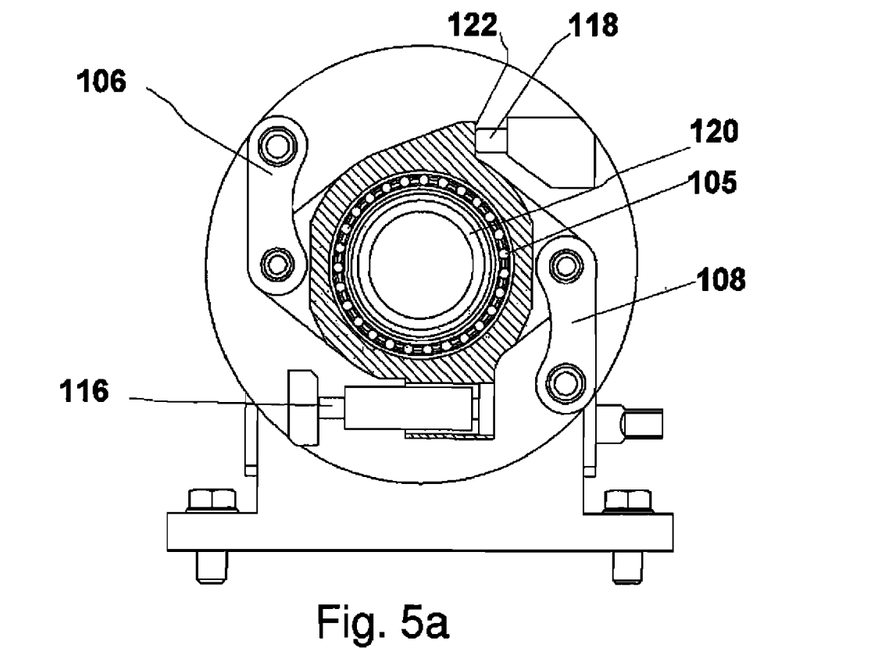
FIGS. 5a and 5b illustrate use of the support arrangement in accordance with FIG. 4, for bowing the roll.

FIG. 5a is a plane view of the roll supporting arrangement in accordance with FIG. 4. The figure shows a basic position in which bending of the roll has not yet been started, but the shaft sleeve of the outer shell is concentric with the roll shaft. In other words, in the figure the bearing portion 120 of the bearing bracket 100 is shown concentric with the bearing 105 located inside the ring 104. The spring device 116 functions also in the "state of rest" in such a manner that it presses the ring 104 to the right, in which case the adjusting screw 118 is supported by its counter surface 122 in the ring 104. Then, the spring device 116 removes all clearances from the system and stiffens the structure.

FIG. 5b again shows a situation in which the ring 104 has been transferred to the left against the spring device 116 by means of the adjusting screw 118. It can be noted that regardless of the turning of levers 106 and 108, the center of the ring 104 has stayed in the same height, in other words the movement of the center has taken place linearly.

Figure 5B:
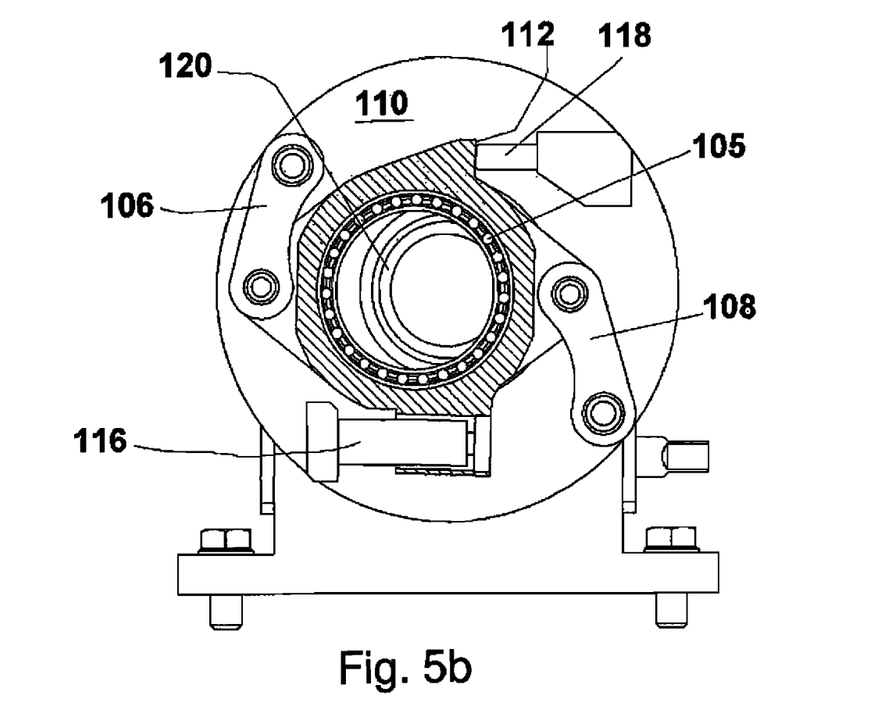

Besides the opposite side of the ring 104 with regard to the spring device 116, as described above, the adjusting screw

118 can be situated almost anywhere in connection with the ring 104. It is even possible to arrange an adjusting screw between the lever 106 or lever 108 and disc 110. Essential is only that it is possible to adjust the position of the ring by means of the adjusting screw in the direction allowed by the spring device.

An advantage of the structure described hereinabove, when compared with, e.g., prior art is among other things that both the deviation of the outer shell and the adjustment of the roll bow can be effected by means of one adjusting device 118. Furthermore, bowing always takes place in the same plane regardless of the amount of bow.

As shown by the above description, a totally novel type of roll supported at the middle thereof has been developed, by means of which roll it is possible to reduce or even totally eliminate several problems and defects characteristic to prior art rolls. It has to be also noted that even though the roll in accordance with the invention has been presented mainly as a calender fly roll, the invention is applicable to all those places in which a roll supported at the middle thereof can be used, such as for example spreader rolls. Further, it is noteworthy that even though FIGS. 2 to 5 illustrate only a few arrangements for supporting the roll end, they do not in any way mean that only these supporting/bearing arrangements should be used in connection with the roll of the invention, but also other kinds of support arrangements can be applied. Naturally also a conventional roll provided with an outer shell which has completely unsupported ends, as shown in FIG. 1, falls within the scope of the invention. It has to be also noted with regard to the above description of the invention that the invention is described in the light of only a few exemplary, most preferred and stereotyped embodiments. It is therefore clear that the invention can deviate even considerably from the above-described embodiments, yet staying within the scope of protection defined by the accompanying claims.

The invention claimed is:

1. A roll in a paper, board or finishing machine comprising:
    an inner shell defining an axis direction, having a middle, and made of a first material having a first density, and a first modulus of elasticity in the axial direction, and a first nominal stiffness defined as the first modulus of elasticity in the axial direction divided by the first density of 0.055 to 0.165 Gnm/kg;
    wherein the inner shell of the roll has two ends which are supported by inner bearings at the ends of the inner shell;
    an outer shell having a middle and made of a second material having a second density, and a second modulus of elasticity in the axial direction, and a second nominal stiffness defined as the second modulus of elasticity in the axial direction divided by the second density of 0.035 to 0.055 GNm/kg, the inner shell middle and the outer shell middle in supporting engagement, the outer shell being in direct supporting engagement with the inner shell only about the inner shell middle;
    wherein the outer shell of the roll has two ends which are supported by outer bearings at the ends of the outer shell, so that vibration of the ends of the outer shell is controlled; and
    wherein the first modulus of elasticity in the axial direction is 2-4 times the second modulus of elasticity in the axial direction.

2. The roll of claim 1 wherein at least one of the inner shell and the outer shell is comprised of composite material.

3. The roll of claim 1 wherein the inner shell is wound of tar or pitch fibers.

4. The roll of claim 1 wherein the paper, board or finishing machine has a frame structure, and wherein the roll has two ends comprising:
    a first roll end supported by a first outer bearing mounted on the frame structure, and
    a second roll end supported by a second outer bearing mounted on the frame structure.

5. The roll of claim 1 further comprising a means for tension measuring mounted to the roll.

6. The roll of claim 1 further comprising a means for driving the roll in a hypercritical speed range.

7. The roll of claim 2 wherein the inner shell is of composite material made up of winding layers, and wherein at least 70% of the layers have fibers wound to an angle from 0 to 30 degrees with respect to the axial direction.

8. The roll of claim 2 wherein the outer shell is made of fiberglass, carbon fiber, or plastic.

9. The roll of claim 2 wherein the outer shell is comprised of composite material made up of winding layers, and wherein at least 70% of the layers have fibers wound to an angle from 0 to 30 degrees with respect to the axial direction.

10. The roll of claim 4 wherein the outer shell first bearing and second bearing are mounted for radial movement perpendicular to the axial direction defined by the inner shell.

11. The roll of claim 10 wherein the outer shell first bearing and second bearing are arranged for radial movement in a direction defined by guides or levers.

12. The roll of claim 10 further comprising adjusting devices which define a radial movement magnitude.

13. The roll of claim 12 further comprising spring devices which oppose the adjusting devices.

14. The roll of claim 12 wherein the adjusting devices comprise at least one screw which is mounted for rotation.

15. The roll of claim 13 wherein the spring devices are gas springs.

16. A roll in a paper, board or finishing machine comprising:
    an inner shell defining an axis direction, having a middle, and made of a first material including pitch-based fibers with at least 70% of the pitch-based fibers being arranged wound to an angle from 0 to 30 degrees with respect to the axial direction to have a first axial modulus of elasticity in the first material in the axial direction of from 160 to 250 GPa, the inner shell having end sleeves; and
    an outer shell having a middle, and made of a second material which has an axial modulus of elasticity in the axial direction of less than the first axial modulus of elasticity, the outer shell having shaft sleeves defining inner spaces;
    wherein the first modulus of elasticity in the axial direction is 2-4 times the second modulus of elasticity in the axial direction;
    wherein the inner shell middle and the outer shell middle are in supporting engagement, the outer shell being in direct supporting engagement with the inner shell only about the inner shell middle;
    outer bearings, mounted to the paper, board or finishing machine, the outer bearings supporting the outer shell shaft sleeves;
    a shaft journal protruding through the inner space of the outer shell shaft sleeve and attached to the inner shell end sleeves;
    inner bearings mounted to the paper, board or finishing machine, the inner bearings rotatably supporting the shaft journals; and wherein either the outer bearings are mounted for adjustment in a radial direction perpendicular to the axial direction with respect to the inner bearings to produce a selected bow of the outer shell, or the inner bearings are mounted for adjustment in the radial direction with respect to the outer bearings to produce a selected bow of the outer shell.

17. The roll of claim 16 wherein the outer shell is of composite material made up of winding layers, and wherein at least 70% of the layers have fibers wound to an angle from 0 to 30 degrees with respect to the axial direction.

* * * * *